(No Model.)
J. PAUL.
CLOTHES LINE.
No. 304,952. Patented Sept. 9, 1884.
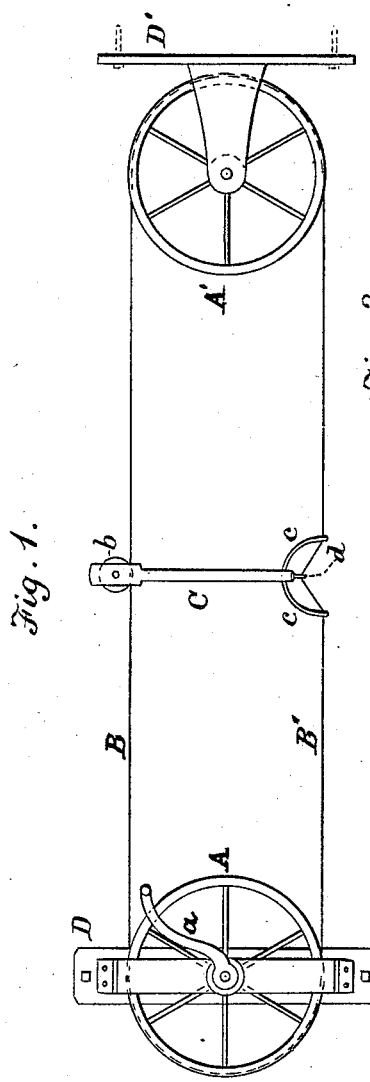
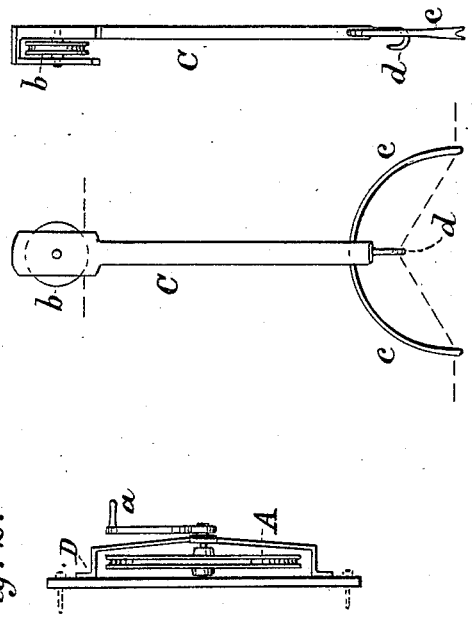
Witnesses:
W. Burris
G. B. Towles
Inventor:
Joseph Paul
by H. A. Daniels
Attorney

UNITED STATES PATENT OFFICE.

JOSEPH PAUL, OF LONDONVILLE, OHIO.

CLOTHES-LINE.

SPECIFICATION forming part of Letters Patent No. 304,952, dated September 9, 1884.

Application filed March 6, 1882. (No model.)

*To all whom it may concern:*

Be it known that I, JOSEPH PAUL, a citizen of the United States, residing at Londonville, in the county of Ashland and State of Ohio, have invented certain new and useful Improvements in Clothes-Lines, of which the following is a specification, reference being had therein to the accompanying drawings.

My invention relates to that class of clothes-lines in which the line is formed of an endless cord or wire arranged on grooved wheels; and it consists in an improvement in the construction of the same, as herein shown, described, and claimed.

In the accompanying drawings, Figure 1 is a side view of a clothes-line having my improvement. Fig. 2 represents an edge view of one of the grooved wheels within a frame and provided with a crank. Fig. 3 represents a brace for the line in side and edge views.

A and A' designate two grooved wheels, which are mounted in suitable frames. An endless cord or wire is arranged on said wheels, so as to form an upper line, B, and a lower line, B', the latter being the part upon which articles of clothing are usually hung.

C indicates a brace or support for the line when filled with clothes, said brace connecting the parts B and B', and sustaining them in position and preventing sagging of the line. The said brace is constructed substantially in the form shown in Fig. 3, the upper part being provided with a pulley or grooved wheel, $b$, which turns on a pin or bolt, and the lower end being provided with a hook, $d$, and arms $c$. The said arms extend in opposite directions from the stock of the brace C, and turn downward. They are forked or notched at their extremities and extend downward somewhat farther than the hook $d$, the arms and hook serving to retain the brace in position on the lower line, as hereinafter stated.

In adjusting the brace on the clothes-line it is placed in an upright position, with the wheel $b$ resting on the upper line, B. The lower line, being in the notches in the ends of the arms $c$, is passed onto the hook $d$, bringing that part of the line between arms $c$ to an angle at the hook, as seen in Fig. 1, such construction and attachment preventing the brace from sliding on the lower line, while the wheel $b$ runs freely on the upper line, B. A desirable result is also effected by taking up the slack of the line in drawing it up and placing it in the hook $d$, the line passing under the arms $c$ being tightened by this manner of attachment. The first garment or article being hung on the lower line near wheel A, the crank $a$ is turned, moving the line forward, when another article is put on, and so on. When the line is partly filled, a brace, C, is adjusted to it, when the line may be moved along as before, and the brace carried to a point central of the line. If the line is heavily loaded, two or more braces may be used, being placed thereon at intervals.

The frames D D', in which the wheels are hung, may be constructed for attachment to posts or any suitable fixtures.

The wheel A may be placed under cover or mounted within the wash-room, the endless wire being extended into the open air, and being adjusted on the wheel A', and when thus arranged the clothes-line may be filled and the brace properly attached without going out of doors or walking over intervening ground used as a lawn or garden.

I am aware of Patents No. 116,632, dated July 4, 1871, and No. 134,849, dated January 14, 1873; but the devices shown in said patents do not fully answer the purpose of my invention by which the line is tightened on the wheels, the brace being also held securely in position.

Having described my invention, I claim—

In combination with a clothes-line consisting of an endless cord and grooved wheels suitably mounted, a brace, the stock of which is provided at its upper part with a grooved wheel, $b$, the lower part being provided with a hook, $d$, and arms $c$, notched at their extremities, substantially as and for the purposes described.

JOSEPH PAUL.

Witnesses:
 FREDERICK SMITH,
 HENRY T. HITE.